US009171571B2

(12) United States Patent
Ozdemir et al.

(10) Patent No.: US 9,171,571 B2
(45) Date of Patent: Oct. 27, 2015

(54) READ CHANNEL OPERABLE TO CALIBRATE A COEFFICIENT OF A FILTER, SUCH AS AN FIR FILTER, DISPOSED BEFORE AN INTERPOLATED-TIMING-RECOVERY CIRCUIT, AND RELATED INTEGRATED CIRCUIT, SYSTEM, AND METHOD

(75) Inventors: Hakan Ozdemir, San Jose, CA (US); Jonathan James Ashley, Los Gatos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1643 days.

(21) Appl. No.: 11/711,479

(22) Filed: Feb. 26, 2007

(65) Prior Publication Data

US 2007/0250556 A1 Oct. 25, 2007

Related U.S. Application Data

(60) Provisional application No. 60/776,256, filed on Feb. 24, 2006.

(51) Int. Cl.
*G11B 20/10* (2006.01)
*G11B 20/18* (2006.01)

(52) U.S. Cl.
CPC .... *G11B 20/10009* (2013.01); *G11B 20/10027* (2013.01); *G11B 20/10046* (2013.01); *G11B 20/10222* (2013.01); *G11B 20/10296* (2013.01); *G11B 20/10481* (2013.01); *G11B 20/1876* (2013.01)

(58) Field of Classification Search
CPC ............... G11B 20/10009; G11B 20/10027; G11B 20/10046
USPC ...................... 708/322, 323; 360/65
See application file for complete search history.

(56) References Cited

U.S. PATENT DOCUMENTS

| 6,492,918 | B1 | 12/2002 | Rezzi et al. |
| 6,587,059 | B2 | 7/2003 | Rezzi et al. |
| 6,604,204 | B1 | 8/2003 | Ozdemir et al. |
| 6,662,338 | B1 | 12/2003 | Rezzi et al. |
| 6,819,514 | B1* | 11/2004 | Behrens et al. ................. 360/65 |
| 2003/0137765 | A1* | 7/2003 | Yamazaki et al. .............. 360/39 |

* cited by examiner

*Primary Examiner* — Chuong D Ngo
(74) *Attorney, Agent, or Firm* — Seed IP Law Group PLLC

(57) ABSTRACT

An embodiment of a read channel includes a filter, an interpolator, a recovery circuit, an error detector, a reverse interpolator, and a filter calibrator. The filter is operable to receive a raw sample of a signal and a coefficient-correction value, generate a filtered sample from the raw sample and a pre-established coefficient, and change the coefficient in response to the coefficient-correction value. The interpolator is operable to interpolate the filtered sample, and the recovery circuit is operable to generate a data symbol from the interpolated sample. The error detector is operable to generate an ideal sample from the data symbol and to generate a difference between the ideal sample and the interpolated sample, and the reverse interpolator is operable to reverse interpolate the difference. The filter calibrator is operable to receive the raw sample and to generate the coefficient-correction value from the raw sample and the reverse-interpolated difference.

13 Claims, 5 Drawing Sheets

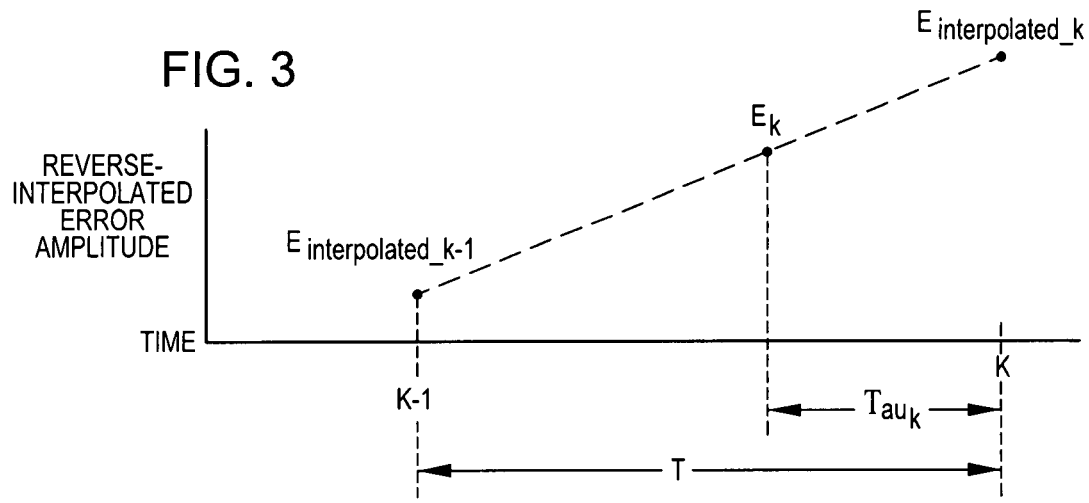

$i=1$ $$[S_1, S_2, \ldots, S_{n-M+1}]$$
$$\times \quad \times \quad \quad \times$$
$$[S_1, S_2, \ldots, S_{n-M+1}]$$
$$=$$
$$R_1 = S_1^2 \, S_2^2 + \ldots + S_{n-M+1}^2$$

$i=2$ $$[S_1 + S_2, \ldots, S_{n-M+1}]$$
$$\times \quad \times \quad \quad \times$$
$$[S_1, S_2, S_3, \ldots, S_{N-M+2}]$$
$$= \quad =$$
$$R_2 = S_1 S_2 + S_2 S_3 + \ldots, S_{N-M+1} S_{N-M+2}$$

$i=3$ $$[S_1, S_2, \ldots, S_{n-m+1}]$$
$$\times \quad \times \quad \quad \times$$
$$[S_1, S_2, S_3, S_4, \ldots, S_{N-m+3}]$$
$$= \quad = \quad =$$
$$R_3 = S_1 S_3 + S_2 S_4 + \ldots + S_{N-M+1} S_{N-M+3}$$

FIG. 5

$R_{xx}$ = Toeplitz (R) = Toeplitz ( [ $R_1, R_2, R_3, R_4, \ldots, R_m$ ) =

$$\begin{bmatrix} R_1 & R_2 & R_3 & R_4 & \ldots & R_m \\ R_2 & R_1 & R_2 & R_3 & \ldots & R_{m-1} \\ R_3 & R_2 & R_1 & R_2 & \ldots & R_{m-2} \\ R_4 & R_3 & R_2 & R_1 & \ldots & R_{m-3} \\ \vdots & & & & & \vdots \\ R_m & R_{m-1} & R_{m-2} & R_{m-3} & \ldots & R_1 \end{bmatrix} = R_{xx}$$

FIG. 6

$i = 1$
$[\, S_{IST},\ S_{IST+1},\ \ldots\ S_{n-IST+2}\,]$
$\quad\ \times\qquad \times\qquad\qquad \times$
$[\, E_1,\ E_2,\ \ldots\ E_{N-M+1}\,]$
$\quad\ =\qquad =\qquad\qquad =$
$R_{x,fx-y\_1} = S_{IST}E_1 + S_{IST+1}E_2 + \ldots + S_{n-IST+2}E_{N-M+1}$ $i = 2$
$[\, S_{IST},\ S_{IST+1},\ \ldots,\ S_{n-IST+2}\,]$
$\quad\ \times\qquad \times\qquad\qquad \times$
$[\, E_1,\ E_2,\ E_3,\ \ldots,\ E_{N-M+2}\,]$
$\quad\ =\qquad =\qquad\qquad =$
$R_{x,fx-y\_2} = S_{IST}E_2 + S_{IST+1}E_3 + \ldots + S_{n-IST+2}E_{N-M+2}$ $i = 3$
$[\, S_{IST},\ S_{IST+1},\ \ldots\ S_{n-IST+2}\,]$
$\quad\ \times\qquad \times\qquad\qquad \times$
$[\, E_1,\ E_2,\ E_3,\ E_4,\ \ldots\ E_{n-m+3}\,]$
$\quad\ =\qquad =\qquad\qquad =$
$R_{x,fx-y\_3} = S_{IST}E_3 + S_{IST+1}E_4 + \ldots + S_{n-IST+2}E_{n-m+3}$ FIG. 7 $\quad \Gamma = [\, 0, 0, 0, 0, 0, 1, 0, 0, 0, 0, \,]$ FIG. 8 $\quad \Phi = [\, 0, 0, 0, 0, \sqrt{1/2}, 0, -\sqrt{1/2}, 0, 0, 0 \,]$ FIG. 9 $\quad \Gamma\Phi = \begin{bmatrix} 0 & 0 & 0 & 0 & 0 & 1 & 0 & 0 & 0 & 0 \\ 0 & 0 & 0 & 0 & \sqrt{1/2} & 0 & -\sqrt{1/2} & 0 & 0 & 0 \end{bmatrix}$

READ CHANNEL OPERABLE TO CALIBRATE A COEFFICIENT OF A FILTER, SUCH AS AN FIR FILTER, DISPOSED BEFORE AN INTERPOLATED-TIMING-RECOVERY CIRCUIT, AND RELATED INTEGRATED CIRCUIT, SYSTEM, AND METHOD

CLAIM OF PRIORITY

This application claims priority to U.S. Provisional Application Ser. No. 60/776,256, filed on Feb. 24, 2006, which is incorporated by reference.

BACKGROUND

FIG. 1 is a block diagram of a conventional read channel 10 for recovering data from an analog read signal. E.g., a storage-disk read head or a wireless-device antenna (neither shown in FIG. 1) may generate the read signal.

The read channel 10 includes an analog-to-digital converter (ADC) 12, a variable-gain amplifier (VGA) 14, an interpolated-timing-recovery circuit (ITR) 16, a finite-impulse-response filter (FIR) 18, a Viterbi detector 20, and a phase-error detector (PE) 22. The ITR 16, FIR 18, Viterbi detector 20, and PE 22 form a timing loop (TLP) 24 for phase acquisition and tracking. The read channel 10 may also include other components that are omitted from FIG. 1 for brevity.

An example of a read channel similar to the read channel 10 is disclosed in U.S. patent application Ser. No. 11/402,155, filed Apr. 10, 2006, which is incorporated by reference.

The ADC 12 generates raw digital samples S of the read signal in response to a sample clock that is unsynchronized to the read signal, and the VGA 14 adjusts the amplitudes of the raw samples S such that these amplitudes are within a predetermined range that is suitable for the ITR 16, FIR 18, and Viterbi detector 20. Furthermore, although the sample clock is unsynchronized to the read signal, it typically has the same or approximately the same frequency as the data carried by the read signal.

The ITR 16 interpolates the gain-adjusted samples according to a target polynomial (e.g., PR4, EPR4 and E²PR4) that corresponds to the characteristics of the read signal and according to a phase-interpolation value Tau that is related to the phase error between the read signal and the sample clock. Generally, the ITR 16 interpolates each gain-adjusted raw sample by causing the amplitude of the interpolated sample to equal (or approximately equal) the amplitude that the gain-adjusted raw sample would have had if the sample clock were in-phase (phase error=0) with the read signal. That is, the ITR 16 effectively shifts the phase of the interpolated sample by Tau relative to the phase of the gain-adjusted raw sample.

The FIR 18 equalizes the interpolated samples according to the target polynomial. The topology and filter coefficient(s) of the FIR 18 provide the FIR with a transfer function that corresponds to the target polynomial. That is, the transfer function causes the FIR to "fit" the interpolated samples to the target polynomial.

The Viterbi detector 20 recovers data from the read signal according to the target polynomial.

The PE 22 acquires and tracks the phase error between the sample clock and the data carried by the read signal, generates the phase-interpolation value Tau in response to the phase error, and provides the phase-interpolation value Tau to the ITR 16. For example, the PE 22 may generate Tau equal (or approximately equal) to the phase error, although in most instances, Tau does not equal the instantaneous phase error due to the latency of the TLP 24.

Still referring to FIG. 1, a potential problem with the read channel 10 is that the latency of the TLP 24 is relatively long, and thus causes the bandwidth of the loop to be relatively low. Because of this low bandwidth, the TLP 26 may provide little or no correction of high-frequency phase errors caused by, e.g., jitter in the velocity of a rotating storage disk.

SUMMARY

An embodiment of a read channel includes a filter, an interpolator, a recovery circuit, an error detector, a reverse interpolator, and a filter calibrator. The filter is operable to receive a raw sample of a signal and a coefficient-correction value, generate a filtered sample from the raw sample and a pre-established coefficient, and change the coefficient in response to the coefficient-correction value. The interpolator is operable to interpolate the filtered sample, and the recovery circuit is operable to generate a data symbol from the interpolated sample. The error detector is operable to generate an ideal sample from the data symbol and to generate a difference between the ideal sample and the interpolated sample, and the reverse interpolator is operable to reverse interpolate the difference. The filter calibrator is operable to receive the raw sample and to generate the coefficient-correction value from the raw sample and the reverse-interpolated difference.

Because in such a read channel the filter is located before the interpolator, and thus is outside of the timing loop, the latency of the loop is reduced, and thus the bandwidth of the loop is increased, as compared to the timing loop of the read channel 10 (FIG. 1) and the timing loops of other prior read channels.

Furthermore, the reverse interpolator and calibrator allow calibration of the filter coefficient(s) even though the filter is located before the interpolator—techniques for calibrating the coefficient(s) of a filter that is located after the interpolator are typically unsuitable for calibrating the coefficient(s) of a filter that is located before the interpolator.

BRIEF DESCRIPTION OF THE DRAWINGS

FIG. 3 is a plot showing a linear reverse-interpolation technique employed by the reverse-interpolated-timing-recovery circuit of FIG. 2 according to an embodiment of the invention.

FIG. 4 shows the technique employed by the FIR calibrator of FIG. 2 for auto correlating the samples of the read signal according to an embodiment of the invention.

FIG. 5 shows the technique employed by the FIR calibrator of FIG. 2 for generating an auto-correlated-sample matrix according to an embodiment of the invention.

FIG. 6 shows the technique employed by the FIR calibrator of FIG. 2 for cross-correlating the samples of the read signal with the reverse-interpolated error values according to an embodiment of the invention.

FIG. 7 is a gain-correction vector that the FIR calibrator of FIG. 2 may use in conjunction with the calibration of the finite-impulse-response filter of FIG. 2 according to an embodiment of the invention.

FIG. 8 is a phase-correction vector that the FIR calibrator of FIG. 2 may use in conjunction with the calibration of the finite-impulse-response filter of FIG. 2 according to an embodiment of the invention.

FIG. 9 is a gain-and-phase-correction matrix that the calibrator of FIG. 2 may use in conjunction with the calibration of the finite-impulse-response filter of FIG. 2 according to an embodiment of the invention.

DETAILED DESCRIPTION

Figure 1:
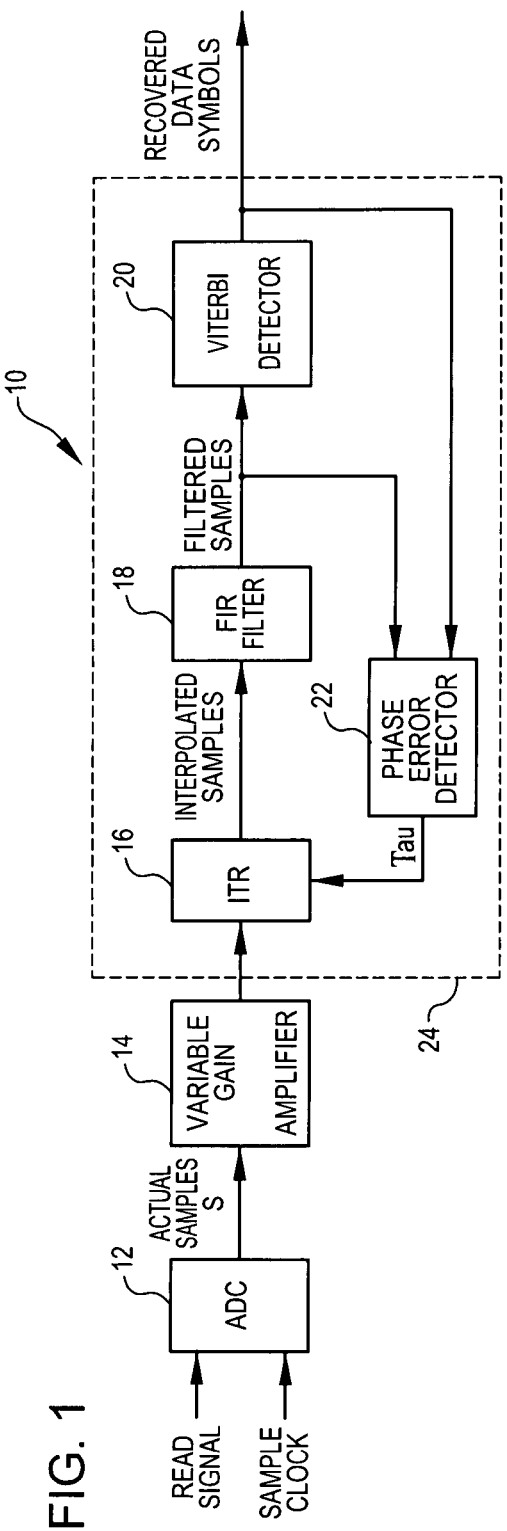
FIG. 1 is a block diagram of a conventional read channel.
Figure 2:
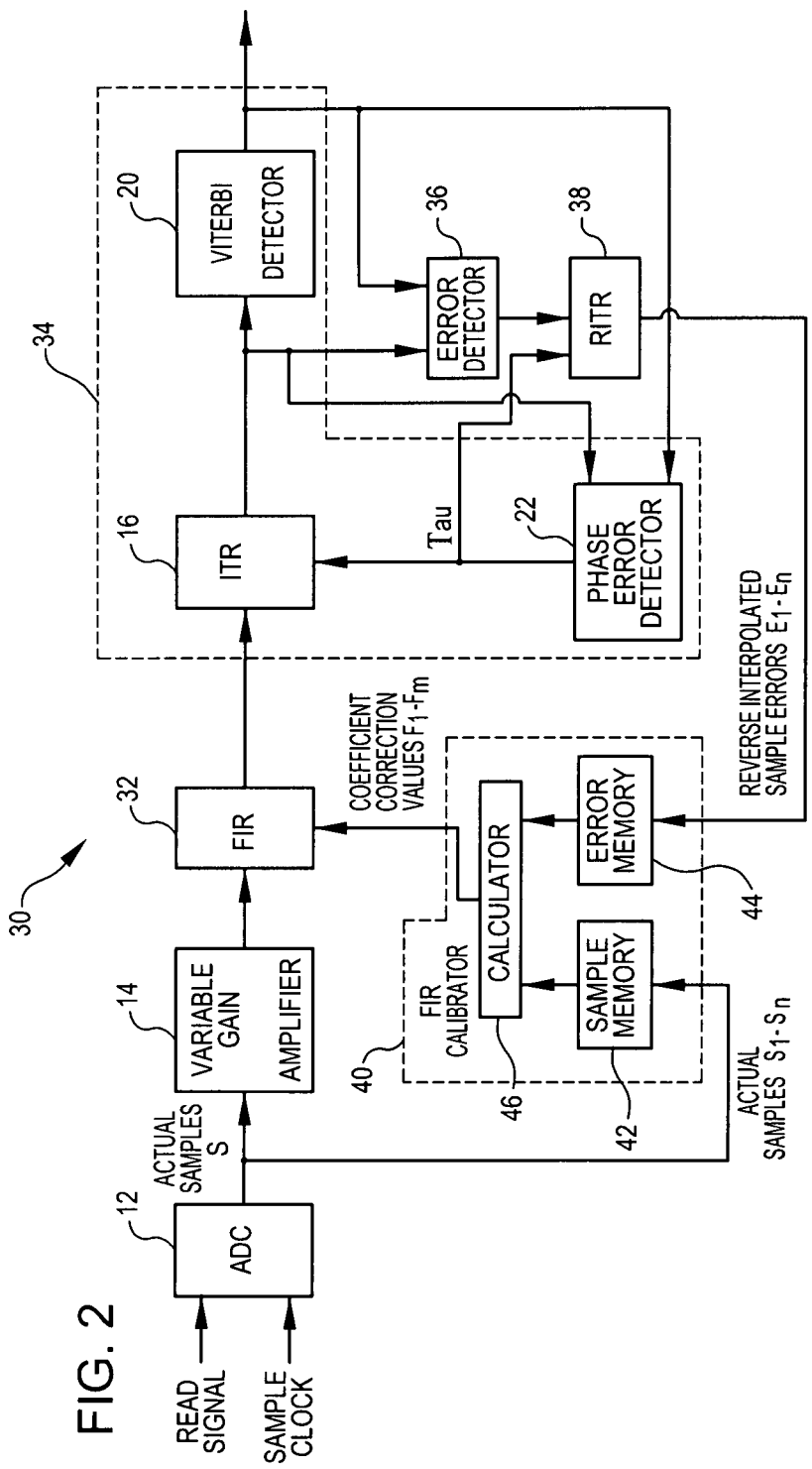
FIG. 2 is a block diagram of a read channel according to an embodiment of the invention.

FIG. 2 is a block diagram of a read channel 30 for, e.g., a disk drive or cell phone (neither shown in FIG. 2) according to an embodiment of the invention, where like numbers reference components common to the read channel 30 and the read channel 10 of FIG. 1. The read channel 30 includes an FIR 32, which may be similar to the FIR 18 of the read channel 10. But unlike the FIR 18, the FIR 32 is located before, i.e., on the input side of, the ITR 16, and thus is located outside of a TLP 34 of the read channel 30. Locating the FIR 32 outside of the TLP 34 may reduce the latency, and thus may increase the bandwidth, of the TLP 34 as compared to the latency and the bandwidth of prior TLPs such as the TLP 24 of the read channel 10. Consequently, the TLP 34 may be better able to track high-frequency phase errors between the sample clock and the data carried by the read signal.

In addition to the ADC 12, VGA 14, ITR 16, Viterbi detector 20, phase-error detector 22, FIR 32, and TLP 34, the read channel 30 includes a sample-error detector 36, a reverse interpolator (RITR) 38, and an FIR calibrator 40 for calibrating the coefficients of the FIR 32 according to an embodiment of the invention.

The FIR 32 may be similar to the FIR 18 of FIG. 1, or may be modified to account for one or both of an under-sampling condition and an over-sampling condition that may occur when the frequency of the sample clock is respectively lower or higher than the frequency of the data carried by the read signal.

The TLP 34 includes the ITR 16, Viterbi detector 20, and the phase-error detector 22. Like the TLP 24 of FIG. 1, the TLP 34 acquires and tracks the phase error between the sample clock and the data carried by the read signal. But as discussed above, because the TLP 34 lacks an FIR filter, the TLP 34 may have a higher bandwidth than the TLP 24.

The sample-error detector 36 calculates respective differences, i.e., error values, between the interpolated samples from the ITR 16 and the corresponding ideal samples. The target polynomial for which the read channel 30 is designed relates a data symbol (e.g., a data bit) generated by the Viterbi detector 20 to the sequence of ideal read-signal samples that represent the data symbol as discussed in U.S. Pat. Nos. 6,492,918, 6,587,059, 6,662,338, and 6,604,204, which are incorporated by reference. The sample-error detector 36 may obtain the ideal samples by solving the target polynomial for each data symbol generated by the Viterbi detector 20, or by storing the ideal samples in a look-up table (LUT). Furthermore, the sample-error circuit 36 conventionally accounts for the latency between the output of the ITR 16 and the output of the Viterbi detector 20 so as to associate the ideal sample generated for the current data symbol with the interpolated sample corresponding to the current data symbol.

The RITR 38 generates reverse-interpolated error values E by reverse interpolating the error values from the sample-error detector 36. The RITR 38 performs this reverse interpolation by effectively removing the phase correction that the ITR 16 imparts to the interpolated samples. Because the FIR 32 is on the input side of the ITR 16, the FIR 32 filters samples that have not yet been phase corrected by the ITR 16. Therefore, to accurately calibrate the coefficients of the FIR 32, the calibrator 40 uses the reverse-interpolated error values E from which the ITR phase correction has been removed. Depending on the accuracy of the RITR 38, this removal of the phase correction may be complete or partial. The operation of the reverse interpolator 36 is further discussed below in conjunction with FIG. 3.

The FIR calibrator 40 includes a sample memory 42, an error memory 44, and a calculator 46. The sample memory 42 stores n raw samples $S_1$-$S_n$ of the read signal from the ADC 12. For example, the sample memory 42 may store raw samples $S_1$-$S_n$ from an entire data sector of a storage disk (not shown in FIG. 2), where n equals, e.g., 4096 ($2^{12}$) samples. The error memory 44 stores n or approximately n reverse-interpolated error values E that each correspond to a respective sample S—hereinafter it is assumed for purposes of discussion that the error memory 44 stores n reverse-interpolated error values $E_1$-$E_n$. And as discussed further below in conjunction with FIGS. 4-9, the calculator 46 calculates one or more coefficient-correction values $F_1$-$F_m$ that respectively correspond to the m coefficient(s) $C_1$-$C_m$ of the FIR 32. In response to the coefficient-correction value(s) $F_1$-$F_m$, the FIR 32 updates the filter coefficients $C_1$-$C_m$ so as to reduce or eliminate a mismatch between the read signal and the read channel 30. In one example, m=10.

Still referring to FIG. 2, the operation of the read channel 30 is discussed according to an embodiment of the invention.

The ADC 12 generates raw digital samples $S_1$-$S_n$ of the read signal, which typically carries data that is divided into one or more blocks each having a predetermined size. For example, if the read channel 30 is part of a disk drive system (not shown in FIG. 2), then a data block may be a disk data sector having a size of, e.g., 4096 data bits as discussed above. The number n may be evenly divisible by the data-block size, although this is not required.

The VGA 14 amplifies the samples $S_1$-$S_n$, and the FIR 32 equalizes the amplified samples to the target polynomial.

The ITR 16 corrects the phase of the equalized samples in response to the phase-interpolation value Tau (this phase correction may be full or partial), and the Viterbi detector 20 recovers the data symbols from the phase-corrected samples.

The phase-error detector 22 tracks the phase error between the data carried by the read signal and the sample clock, and updates the phase-interpolation value Tau as appropriate to maintain the phase error at a suitably low value, e.g., less than 5% of the period of the sample clock.

While the VGA 14, FIR 32, ITR 16, Viterbi detector 20, and phase-error detector 22 are operating as described above, the sample-error detector 36 is generating respective differences between the phase-corrected samples from the ITR 16 and the corresponding ideal sample values.

Furthermore, the RITR 38 is generating the reverse-interpolated error values $E_1$-$E_n$ from the respective differences generated by the sample-error detector 36, and the FIR calibrator 40 is storing the samples $S_1$-$S_n$ in the sample memory 42 and the reverse-interpolated error values $E_1$-$E_n$ in the error memory 44. The operation of the RITR 38 is further described below in conjunction with FIG. 3.

While or after the FIR calibrator 40 stores $S_1$-$S_n$ in the memory 42 and $E_1$-$E_n$ in the memory 44, the calibrator calculates the coefficient-correction values $F_1$-$F_m$, which the FIR 32 uses to update its coefficients $C_1$-$C_m$ so as to reduce the mismatch between the read channel 30 and the read signal. The ITR 16 would generate the interpolated samples equal to the ideal samples if the following ideal conditions existed: 1) there were no noise on the read signal, 2) the TLP 34 were perfectly tracking the phase error between the sample clock and the data carried by the read signal, and 3) the ITR and the FIR 32 were perfectly matched to the read signal. But because these ideal conditions typically do not exist, the interpolated samples that the ITR 16 generates typically differ from the corresponding ideal samples. The respective differences between the interpolated samples and the ideal samples (the sample-error detector 36 generates these differences as discussed above) are related to the mismatch between the read channel 30 and the characteristics of the read signal. By calibrating the coefficients of the FIR 32 to reduce or eliminate the respective error differences between the interpolated and ideal samples, the calibrator 40 reduces or eliminates the mismatch between the read channel 30 and the read signal. This calibration, however, need not take place in real time; therefore, the FIR calibrator 40 may generate $F_1$-$F_m$ at any time, such as while the ADC 12, VGA 14, FIR 32, ITR 16, Viterbi detector 20, and phase-error detector 22 are idle.

The FIR calibrator 40 may periodically recalculate the coefficient-correction values $F_1$-$F_m$ so as to track the read channel 30 to the read signal over time—the characteristics of both the read signal and the read channel may change over time in response to, e.g., environmental changes (e.g., temperature), aging of the components that form the read channel 30, and aging of the data-storage disk (in a disk drive). For example, if the read channel 30 is part of a disk drive, the FIR calibrator 40 may recalculate $F_1$-$F_m$, e.g., every data sector or every ten data sectors. The operation of the FIR calibrator 40 is further described below in conjunction with FIGS. 4-9.

Still referring to FIG. 2, alternate embodiments of the read channel 30 are contemplated. For example, the sample memory 42 may store the gain-adjusted samples from the output of the VGA 14 instead of storing the raw samples $S_1$-$S_n$ from the output of the ADC 12. Furthermore, although described as operating at a full rate (one sample S per period of the sample clock), the read channel 30 may operate at a partial rate, such as at half rate (two samples S per period of the sample clock).

FIG. 3 is a plot showing the linear-approximation technique that the RITR 38 (FIG. 2) uses to reverse interpolate the differences from the sample-error detector 36 (FIG. 2) according to an embodiment of the invention.

The RITR 38 circuit 36 linearly approximates a reverse-interpolated error value $E_k$ according to the following equation:

$$E_k = E_{interpolated\_k-1} + (E_{interpolated\_k} - E_{interpolated\_k-1})(T - Tau_k)/T \quad (1)$$

where $E_{interpolated\_k}$ is an interpolated difference generated by the sample-error detector 36 corresponding to a sample time k (and, therefore, to a sample $S_k$), $E_{interpolated\_k-1}$ is an interpolated difference generated by the sample-error detector corresponding to the immediately previous sample time k-1 (sample $S_{k-1}$), T is the period of the sample clock (T=k−k-1), and $Tau_k$ is the phase shift that the ITR 16 (FIG. 2) effectively imparted to the interpolated sample at time k to obtain $E_{interpolated\_k}$. For k=1, $E_{interpolated\_k-1}$ may equal a predetermined value such as zero.

Referring to FIGS. 2 and 3, alternate embodiments of the RITR 38 are contemplated. For example, instead of linearly approximating $E_k$, the RITR 38 may have a transfer function that is the inverse of the transfer function of the ITR 16 such that the RITR "fully" reverse interpolates $E_{interpolated\_k}$ to generate $E_k$.

Referring to FIGS. 2 and 4-6, the operation of the FIR calibrator 40 is discussed according to an embodiment of the invention.

The FIR calibrator 40 calculates the coefficient-correction values $F_1$-$F_m$ according to the following modified Weiner equation:

$$F = R_{x, fx-y} \cdot R_{xx}^{-1} \quad (2)$$

where F is a vector having the elements $F_1, F_2, \ldots, F_m$, m is the number of coefficients C in the FIR filter 32, $R_{x, fx-y}$ is the cross correlation of the sample vector S (having the elements $S_1, S_2, \ldots, S_n$) and the reverse-interpolated-error vector E (having the elements $E_1, E_2, \ldots, E_n$), and $R_{xx}$ is a matrix derived from the auto-correlation of the vector S.

FIG. 4 shows a technique that the FIR calibrator 40 employs to generate an auto-correlation vector R according to an embodiment of the invention. R has m elements $R_1, R_2, \ldots, R_m$, and thus is the same size (1×m) as the vector F.

Referring to FIGS. 2 and 4, the FIR calibrator 38 calculates each element $R_i$ of the vector R for i=1 to m according to the following equation (the calculation of the elements $R_1, R_2,$ and $R_3$ is illustrated in FIG. 4):

$$R_i = S_1 S_i + S_2 S_{i+1} + S_3 S_{i+2} + S_4 S_{i+3} + S_5 S_{i+4} + \ldots + S_{n-m+1} S_{n-m+i} \quad (3)$$

where $S_1, S_2, S_3, \ldots, S_n$ are the elements of the sample vector S.

FIG. 5 shows a technique employed by the FIR calibrator 40 (FIG. 2) for generating the m×m autocorrelation matrix $R_{xx}$ from the auto-correlation vector R according to an embodiment of the invention.

Referring to FIGS. 2 and 5, the FIR calibrator 40 generates the autocorrelation matrix $R_{xx}$ according to the following equation:

$$R_{xx} = \text{Toeplitz}(R) \quad (4)$$

where the Toeplitz function is a well-known function for converting a 1×y vector to a y×y matrix.

FIG. 6 shows a technique employed by the FIR calibrator 40 (FIG. 2) to calculate the 1×m cross-correlation vector $R_{x, fx-y}$ according to an embodiment of the invention.

Referring to FIGS. 2 and 6, the FIR calibrator 40 calculates each element $R_{x, fx-y,i}$ of the vector $R_{x, fx-y}$ for i=1 to m according to the following equation (the calculation of the elements $R_{x, fx-y-1}, R_{x, fx-y-2},$ and $R_{x, fx-y-3}$ is illustrated in FIG. 6):

$$R_{x, fx-y-i} = S_{IST} E_i + S_{IST+1} E_{i+1} + S_{IST+2} E_{i+2} + S_{IST+3} E_{i+3} + S_{IST+4} E_{i+4} + \ldots + S_{n-IST+2} E_{n-m+i} \quad (5)$$

where IST=m/2+1 (IST is the position of the center-tap coefficient of the FIR filter 32 of FIG. 2), $S_{IST+1}, S_{IST+2}, S_{IST+3}, S_{IST+4}, \ldots, S_{n-IST+2}$ are elements of the sample vector S, and $E_i, E_{i+1}, E_{i+2}, E_{i+3}, E_{i+4}, \ldots, E_{n-m+i}$ are elements of the reverse-interpolated-error vector E.

Referring again to FIG. 2, after the FIR calibrator 40 calculates the coefficient-correction vector F according to equation (2), the calibrator provides F to the FIR 32, which updates the FIR coefficients $C_1$-$C_m$ according to the following equation:

$$C_{i\_updated} = C_i + F_i \text{ for } i=1 \text{ to } m \quad (6)$$

where $C_{i\_updated}$ is the $i^{th}$ updated FIR coefficient C, $C_i$ is the $i^{th}$ pre-updated coefficient, $F_i$ is the $i^{th}$ element of F and can be positive or negative, and, as discussed above, m is the number of FIR coefficients C.

Still referring to FIG. 2, alternate embodiments of the FIR calibrator 40 are contemplated. For example, one may alter equation (2) (and equations (3)-(5) as appropriate) such that $C_{i\_updated} = F_i$ for i=1 to m. Furthermore, if the number n of samples is relatively large (e.g., greater than 50), one may alter equation (3) to sum different products of the elements of S, and one may alter equation (5) to sum different products of the elements of S and E.

Referring to FIGS. 2 and 7-9, another embodiment of the FIR calibrator 40 is described according to an embodiment of the invention.

If the RITR 38 uses linear reverse interpolation to calculate E has described above in conjunction with FIG. 3, then the RITR may introduce a gain error, a phase error, or both a gain error and a phase error into the elements of E.

Unfortunately, this error (gain, phase, or combined gain and phase) may introduce a corresponding error into the elements of F, and thus may introduce an error into the coefficients $C_{i\_updated}$.

FIG. 7 is an m-element vector $\lceil$ that the FIR calibrator 40 (FIG. 2) may use to reduce or eliminate the gain error that the RITR 38 (FIG. 2) introduces into the elements of E according to an embodiment of the invention.

FIG. 8 is an m-element vector $\phi$ that the FIR calibrator 40 (FIG. 2) may use to reduce or eliminate the phase error that the RITR 38 (FIG. 2) introduces into the elements of E according to an embodiment of the invention.

FIG. 9 is a 2-x-m-element matrix $\lceil\phi$ that the FIR calibrator 40 (FIG. 2) may use to reduce or eliminate both the gain error and the phase error that the RITR 38 (FIG. 2) introduces into the elements of E according to an embodiment of the invention. The first row of the matrix $\lceil\phi$ equals the vector $\lceil$ of FIG. 7, and the second row of the matrix $\lceil\phi$ equals the vector $\phi$ of FIG. 8.

Referring to FIGS. 2 and 9, the operation of the FIR calibrator 40 is described where the calibrator uses the matrix $\lceil\phi$ to reduce or eliminate both the gain error and the phase error that the RITR 38 introduces into the coefficients $C_1$-$C_m$ via the vector E.

First, the FIR calibrator 40 calculates the vector F according to equation (2) and as otherwise discussed above in conjunction with FIGS. 2 and 4-6.

Next, the FIR calibrator 40 calculates a first intermediate 2×m matrix D according to the following equation:

$$D = (\lceil\phi^T \cdot R_{xx}^{-1} \cdot \lceil\phi)^{-1} \quad (7)$$

where $R_{xx}$ is calculated according to equation (4) and as otherwise discussed above in conjunction with FIGS. 2 and 4-6.

Then, the FIR calibrator 40 calculates a second intermediate 1×m matrix $\Delta D$ according to the following equation:

$$\Delta D = -D \cdot \lceil\phi^T \cdot F^T \quad (8)$$

Next, the FIR calibrator 40 calculates a modified 1×m coefficient-correction vector F' according to the following equation:

$$F' = F + \text{round}[(R_{xx}^{-1}[\phi \cdot \Delta D)^T] \quad (9)$$

where the round function respectively rounds off each of the elements of the resulting vector within the brackets to the nearest integer.

Then, after the FIR calibrator 40 calculates the modified coefficient-correction vector F', the calibrator provides F' to the FIR 32, which updates the FIR coefficients $C_1$-$C_m$ according to the following equation:

$$C_{i\_updated} = C_i + F_i' \text{ for } i=1 \text{ to } m \quad (10)$$

where equation (10) is derived by replacing $F_i$ in equation (6) with $F_i'$ from equation (9). Consequently, the updated coefficients $C_{i\_updated}$ include little or none of the gain error and the phase error that the RITR 38 may have introduced into the reverse-interpolated error vector E.

Still referring to FIGS. 2 and 7-9, alternate embodiments of the FIR calibrator 40 are contemplated. For example, the calibrator 40 may alternate calculating F according to equation (2) and F' according to equation (9) such that the calibrator does not correct for gain error or phase error introduced by the RITR 38 each time that the FIR 32 updates the filter coefficients $C_1$-$C_m$. Furthermore, the elements of $\lceil$, $\phi$, and $\lceil\phi$ may be customized for a particular read channel, and thus may be different than those elements shown in FIGS. 7-9, respectively.

Figure 10:
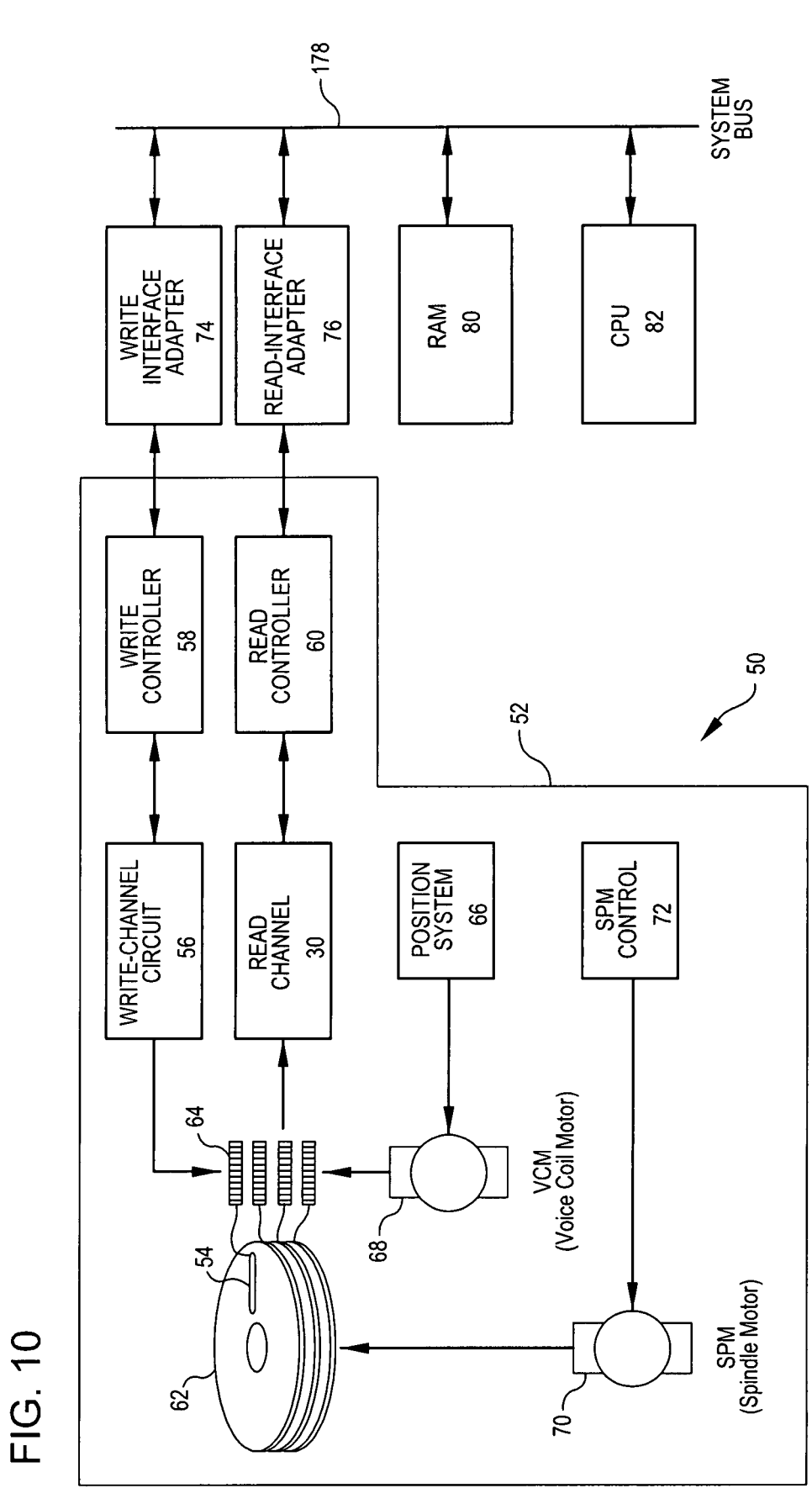
FIG. 10 is a block diagram of a computer system that incorporates the read channel of FIG. 2 according to an embodiment of the invention.

FIG. 10 is a block diagram of a computer system 50, which includes a disk drive 52 according to an embodiment of the invention. The disk drive 52 includes the read channel 30 of FIG. 2. In addition to the read channel 30, the disk drive 52 includes a combination write/read head 54 for generating a read signal, a write-channel circuit 56 for generating and driving the head 54 with a write signal, and a write controller 58 for interfacing the write data to the write-channel circuit 56. The disk drive 52 also includes the read channel 30 for receiving the read signal from the head 54 and for recovering data from the read signal, and includes a read controller 60 for organizing the read data. The disk drive 52 further includes a storage medium such as one or more disks 62, each of which may store data on one or both sides. The read/write head 54 writes/reads the data stored on the disks 62 and is connected to a movable support arm 64. A position system 66 provides a control signal to a voice-coil motor (VCM) 68, which positionally maintains/moves the arm 64 so as to positionally maintain/radially move the head 54 over the desired data on the respective disks 62. A spindle motor (SPM) 70 and a SPM control circuit 72 respectively rotate the disks 62 and maintain them at the proper rotational speed.

The disk drive 52 also includes write and read interface adapters 74 and 76 for respectively interfacing the write and read controllers 58 and 60 to a system bus 78, which is specific to the system used. Examples of system busses include, e.g., ISA, PCI, S-Bus, Nu-Bus.

The computer system 50 also typically includes other devices, such as a random access memory (RAM) 80 and a central processing unit (CPU) 82 coupled to the bus 78.

Still referring to FIG. 10, although the computer system 50 is shown as incorporating the read channel 30 (FIG. 2) via the disk drive 52, other systems, such as a cell-phone system and a wireless-modem system (not shown in FIG. 10), may incorporate the read channel.

From the foregoing it will be appreciated that, although specific embodiments have been described herein for purposes of illustration, various modifications may be made without deviating from the spirit and scope of the invention. Furthermore, where an alternative is disclosed for a particular embodiment, this alternative may also apply to other embodiments even if not specifically stated.

What is claimed is:

1. A read channel, comprising:
   a filter operable to
      receive a raw sample of a signal and a coefficient-correction value,
      generate a filtered sample from the raw sample and a pre-established coefficient, and
      change the coefficient in response to the coefficient-correction value;
   an interpolator coupled to the filter and operable to interpolate the filtered sample;
   a recovery circuit coupled to the interpolator and operable to generate a data symbol from the interpolated sample;
   an error detector coupled to the interpolator and to the recovery circuit and operable to generate an ideal sample from the data symbol, and
generate a difference between the ideal sample and the interpolated sample;
a reverse interpolator coupled to the error circuit and operable to reverse interpolate the difference;
a calibrator coupled to the reverse interpolator and to the filter, and operable to
receive the raw sample, and
generate the coefficient-correction value from the raw sample and the reverse-interpolated difference; and
wherein the calibrator is operable to generate the coefficient-correction value by:
auto-correlating the raw sample to obtain an auto-correlation value;
cross-correlating the raw sample and the reverse-interpolated difference to obtain a cross-correlation value;
generating the coefficient-correction value from the quotient of the cross-correlation and auto-correlation values.

2. The read channel of claim 1 wherein the filter comprises a finite-impulse-response filter.

3. The read channel of claim 1 wherein the interpolator is operable to interpolate the filtered sample by altering the filtered sample in response to a phase difference between the signal and a sample clock in response to which the raw sample is generated.

4. The read channel of claim 1 wherein:
the recovery circuit comprises a Viterbi detector; and
the data symbol comprises a data bit.

5. The read channel of claim 1 wherein:
the interpolator is operable to interpolate the filtered sample by altering the filtered sample in response to a phase difference between the signal and a sample clock in response to which the raw sample is generated; and
the reverse interpolator operable to reverse interpolate the difference between the ideal sample and the interpolated sample by altering the difference in response to the phase difference.

6. The read channel of claim 1 wherein:
the interpolator is operable to interpolate the filtered sample by altering the filtered sample in response to a phase difference between the signal and a sample clock in response to which the raw sample is generated, the sample clock having a period; and
the reverse interpolator operable to reverse interpolate the difference between the ideal sample and the interpolated sample by altering the difference in response to the phase difference, a difference between a previous ideal sample and interpolated sample, and the period of the sample clock.

7. The read channel of claim 1 wherein the calibrator comprises:
a sample memory operable to store the raw sample; and
an error memory operable to store the reverse-interpolated difference.

8. The read channel of claim 1, further comprising an analog-to-digital converter coupled to the filter and operable to:
receive the signal; and
generate the raw sample of the signal.

9. An electronic system, comprising:
an integrated circuit, comprising,
an input node operable to receive a signal,
an output node operable to provide a data symbol recovered from the signal, and
a read channel coupled to the input and output nodes and comprising,
an analog-to-digital converter operable to generate a raw sample of the signal,
a filter coupled to the analog-to-digital converter and operable to
receive a coefficient-correction value,
generate a filtered sample from the raw sample and a pre-established coefficient, and
change the coefficient in response to the coefficient-correction value,
an interpolator coupled to the filter and operable to interpolate the filtered sample,
a recovery circuit coupled to the interpolator and operable to generate the data symbol from the interpolated sample,
an error detector coupled to the interpolator and to the recovery circuit and operable to
generate an ideal sample from the data symbol, and
generate a difference between the ideal sample and the interpolated sample,
a reverse interpolator coupled to the error circuit and operable to reverse interpolate the difference, and
a calibrator coupled to the reverse interpolator and to the filter, and operable to
receive the raw sample, and
generate the coefficient-correction value from a weighted calculation of the raw sample and a differently weighted calculation of the reverse-interpolated difference; and
wherein the calibrator is operable to generate the coefficient-correction value by:
auto-correlating the raw sample to obtain an auto-correlation value;
cross-correlating the raw sample and the reverse-interpolated difference to obtain a cross-correlation value;
generating the coefficient-correction value from the quotient of the cross-correlation and auto-correlation values.

10. The electronic system of claim 9 wherein the integrated circuit comprises a disk-drive controller.

11. The electronic system of claim 9, further comprising a controller coupled to the integrated circuit.

12. The electronic system of claim 9, further comprising:
a disk operable to store the data symbol; and
a head coupled to the input node of the integrated circuit and operable generate the signal from the data symbol.

13. The electronic system of claim 9, further comprising an antenna coupled to the input node of the integrated circuit and operable to receive the signal from a wireless channel.

* * * * *